(12) United States Patent
Kitsunai

(10) Patent No.: US 6,198,071 B1
(45) Date of Patent: Mar. 6, 2001

(54) PROCESS AND SYSTEM FOR RECORDING WELDING SITUATION AND WELDING STATE

(75) Inventor: Keiichiro Kitsunai, Noda (JP)

(73) Assignee: Miyachi Technos Corporation, Chiba (JP)

(*) Notice: Subject to any disclaimer, the term of this patent is extended or adjusted under 35 U.S.C. 154(b) by 0 days.

(21) Appl. No.: 09/361,083

(22) Filed: Jul. 26, 1999

(30) Foreign Application Priority Data

Jul. 27, 1998  (JP) .................................................. 10-210844

(51) Int. Cl.$^7$ ...................................................... B23K 9/10
(52) U.S. Cl. ...................................................... 219/130.01
(58) Field of Search ............................... 219/109, 130.01, 219/130.31, 130.32, 130.33, 130.21, 110

(56) References Cited

U.S. PATENT DOCUMENTS

| | | | |
|---|---|---|---|
| 4,471,207 | * | 9/1984 | Hawkes ........................... 219/130.01 |
| 4,596,917 | * | 6/1986 | Nied et al. ........................... 219/109 |
| 5,708,253 | * | 1/1998 | Bloch et al. ........................ 219/130.01 |
| 5,850,066 | * | 12/1998 | Dew et al. ........................... 219/109 |

* cited by examiner

Primary Examiner—Clifford C. Shaw
(74) Attorney, Agent, or Firm—Koda & Androlia

(57) ABSTRACT

A system for recording a welding situation and a welding state includes an acoustical input means 2, a welding state detecting means 3, and a data recording means 4. A situation information indicating a welding situation is input by voice of an operator by the acoustical input means 2, and a welding information indicating a welding state at that time is detected by the welding state detecting means 3. The acoustical information and the welding information are recorded as regeneratable date by the date recording means 4.

4 Claims, 1 Drawing Sheet

PROCESS AND SYSTEM FOR RECORDING WELDING SITUATION AND WELDING STATE

BACKGROUND OF THE INVENTION

1. Filed of the Invention

The present invention relates to welding situation and state recording process and system, which are capable of recording a welding situation and a welding state for a weld zone in a regeneratable manner.

2. Description of the Related Art

In general, metallurgically joining processes for joining two members to each other include a welding process. Such a welding process is used to joining metals to each other, a metal and a ceramics to each other and polymer materials to each other in the manufacture of a variety of articles such as a ship, a vehicle, a bridge, a common machine structure, electric article and the like. Such conventionally known welding processes include, for example, an arc welding process, a gas welding process, a thermit welding process, an electroslag welding process, an electron beam welding process, a lower-temperature welding process, a ultrasonic welding process, a plasma jet welding process, a laser welding process, a resistance welding process, a friction welding process, a gas welding process, a braze welding process and the like. A variety of welding machines for carrying out these welding processes have been proposed.

For example, a large-scaled automatic line for effectively welding a plurality of different weld zones by operating a resistance welding machine referred to as a spot welding machine, is used for the manufacture of a recent vehicle such as an automobile. The resistance welding machine used in such an automated line is employed in a welding robot capable of performing a variety of welding motions. In such a resistance welding machine, it is necessary to monitor and record the welding state of the resistance welding machine on real time basis in order to stabilize the welding quality. The monitoring and recording of welding information on the welding state for the weld zone welded by the welding machine, e.g., a current, (welding current), a voltage, a weld time, a current wave form, a weld force profile and the like, are carried out by a welding state detecting device.

In the conventional welding state detecting device, the welding information such as a current, a voltage, a weld time, a current wave form and a weld force profile for the weld zone during welding by the welding machine are recorded in a recording medium such as a recording paper, and the information on the welding situation such as the state of a work which is being welded is recorded manually on a recording paper by an operator.

In the conventional welding state detecting device, however, a heat-sensitive paper is used in many cases as the recording paper used as a recording medium for manually recording the information on the welding situation during welding. In this case, the following problem is encountered: the heat-sensitive paper is difficult to record manually, i.e., to write manually, and the heat-sensitive paper itself is sensitive to a heat and a chemical substance and hence, may be discolored in some cases in a factory in which the welding machine is placed. Therefore, the use of the heat-sensitive paper is not very preferred. Further, there is a problem that because it is common that the welding robot carries out the welding of a plurality of, e.g., ten weld zones in a short time, the manual recording of the information on the welding situation on the recording paper by the operator may be not in time for this welding in some cases.

When a flexible disk is used as the recording medium, the information on the welding situation is recorded on an individual recording paper, and the manual recording is carried out smoothly. However, when the welding of a plurality of weld zones is carried out in a short time, the following disadvantage incapable of being solved is encountered: The manual recording of the information on the welding situation by the operator may be not in time for the welding in some cases. Further, when the flexible disk is used as the recording medium, the following problem is encountered: Both of the flexible disk for recording the welding information and a recording paper for recording the situation information are required, and much labor is required both to manage a larger space for keeping in custody the flexible disk having the welding information recorded thereon and a recording paper having the situation information recorded thereon and to manage the flexible disk and the recording paper. When the flexible disk having the welding information recorded thereon and a recording paper having the situation information recorded thereon are individually kept in custody, there is a problem that much labor is required to make a one-to-one correspondence between the recording of the welding situation (situation information) and the recording of the welding state (welding information), when the meaning provided by the welding information is to be analyzed.

To solve the above problems, it is conceived that in addition to the recording of the welding information on the recording medium such as the recording paper by the welding state detecting means, the information on the welding situation is recorded, for example, on a magnetic tape by use of a sound recording device by an operator and kept in custody. In this case, the information on the welding situation can be recorded tactfully on the recording medium such as a magnetic tape, but there is problem that a welding state detecting device capable of recording the welding information on the recording paper and a sound recording device for recording the information on the welding situation are required individually. Further, another problem is that because the welding information and the situation information cannot be recorded together on a magnetic tape for recording the information on the welding situation, the magnetic tape having the situation information recorded thereon and the recording paper having the welding information recorded thereon are kept in custody individually, and hence, a large space for keeping both of the magnetic tape and the recording paper and much labor for managing both of the magnetic tape and the recording paper are required. A yet further problem is that when the magnetic tape and the recording paper are kept in custody individually, much labor is required for making a one-to-one correspondence between the recording of the welding situation (situation information) and the recording of the welding state (welding information), when the meaning provided by the welding information is to be analyzed.

SUMMARY OF THE INVENTION

Accordingly, it is an object of the present invention to provide welding situation and state recording process and system, which are capable of recording a welding situation and a welding state for a weld zone in a regeneratable manner.

To achieve the above object, according to a first aspect and feature of the present invention, there is provided a process for recording a welding situation, comprising the steps of acoustically inputting a situation information indicating a welding situation by voice of an operator, detecting a welding information indicating a welding state at that time, and recording both of the acoustical information and the welding information as regeneratable data.

With the above feature, both of the welding situation for a weld zone welded by a welding machine and the welding state at that time can be regenerated and hence, the welding situation and the welding information can be easily allowed to have a one-to-one correspondence between themselves and compared with each other. As a result, the meaning provided by the welding information can be easily analyzed later, which is an extremely excellent effect.

According to a second aspect and feature of the present invention, there is provided a system for recording a welding situation and a welding state, comprising an acoustical input means for inputting a situation information indicating a welding situation by voice of an operator, a welding state detecting means for detecting a welding information indicating a welding state for a weld zone, and a data recording means for recording both of the situation information indicating the welding situation provided by the acoustical input means and the welding information indicating the welding state provided by the welding state detecting means as regeneratable data.

With the above arrangement, the welding situation and state recording system is operated according to the welding situation and state recording process, whereby the situation information indicating the welding situation such as the state of a welded work piece in the weld zone is input by the acoustical input means, and the welding information indicating the welding state at that time, such as a current (welding current), a voltage, a weld time, a current waveform and a weld force profile is detected by the welding state detecting means. Therefore, with the welding situation and state recording system employing the welding situation and state recording process of the present invention, both of the welding situation for the weld zone and the welding state at that time can be regenerated. Therefore, the welding situation and the welding state can be easily compared for review and as a result, the meaning provided by the welding information can be easily analyzed later.

BRIEF DESCRIPTION OF THE DRAWINGS

The above and other objects, features and advantages of the invention will become apparent from the following description of the preferred embodiment taken in conjunction with the accompanying drawings, in which.

DETAILED DESCRIPTION OF THE PREFERRED EMBODIMENTS

Figure 1:
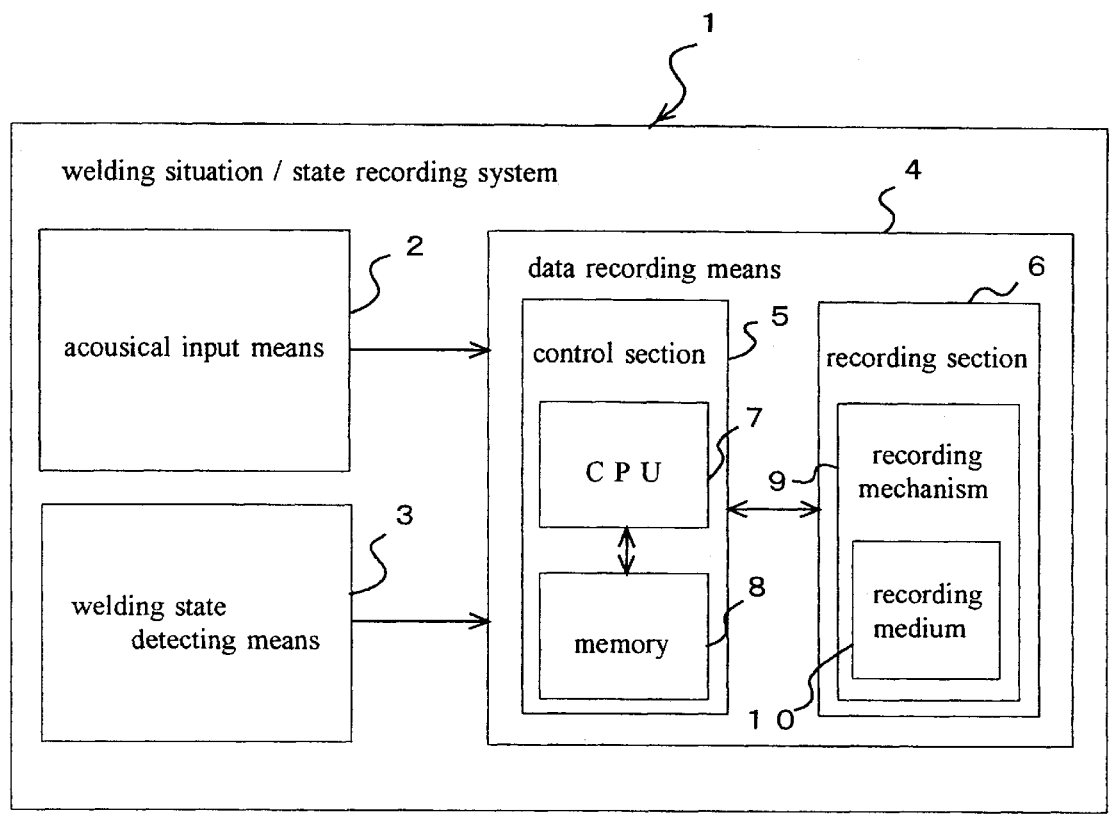
FIG. 1 is a block diagram showing the arrangement of an essential portion in one example perspective view of an essential portion of one embodiment of a welding situation and state recording system according to the present invention using a welding situation and state recording process according to the present invention.

The present invention will now be described by way of embodiments with reference to the accompanying drawings.

A welding situation and state recording system according to an embodiment of the present invention is used for recording a weld zone which is welded by a welding robot including a resistance welding machine designed to weld a weld zone by clamping the weld zone between electrodes with a predetermined pressing force, and by supplying welding current to between the electrodes, and used in an automated line for manufacturing a vehicle such as an automobile, so that information on the welding situation of the weld zone and information on the welding state for the weld zone can be recorded.

As shown in FIG. 1, the welding situation and state recording situation recording system 1 according to this embodiment includes at least an acoustical input means 2, a welding state detecting means 3, and a data recording means 4.

The acoustical input means 2 is adapted to input the information on the welding situation for the weld zone by the voice of an operator, and comprises a mechanism capable of converting the operator's voice into an electric signal, e.g., a mechanism using a microphone for use in recording. The information on the situation input by the acoustical input means 2 may be delivered to the data recording means 4 by either radio-telegraphy or wire telegraphy. Further, when the information on the situation is analog data, it is preferable that the analog data is converted into digital data by a known A/D converter. Alternatively, a plurality of acoustic input means 2 may be used.

The welding situation and state detecting means 3 is adapted to provide information on the welding state for the weld zone. Various sensors may be used alone or in combination as the welding situation detecting means 3, as required, e.g., depending on a design concept, such as a current sensor using a toroidal coil for detecting electric current (welding current) in the electrodes in the resistance welding machine by use of induction current, a load cell for detecting the weld force between the electrodes in the resistance welding machine by use of a strain gauge, and a displacement sensor for detecting the displacement between the electrodes in the resistance welding machine. Such various sensors used in the resistance welding machine are mounted to an electrode referred to as a chip in the resistance welding machine, but a sensor not mounted to the electrode may be used. The welding information on the welding state for the weld zone detected by the welding state detecting means 3 may be delivered to the data recording means 4 by either radio-telegraphy or wire-telegraphy. The weld force between the electrodes in the resistance welding machine is measured in a state in which electric current is not supplied, but may be measured during supplying electric current, depending on the type of the device. Further, when the welding information is analog data, it is desirable that the analog data is converted into digital data by a known A-D converter.

The arrangement of the welding state detecting means 3 according to this embodiment is adapted to detect the welding state of the resistance welding machine, and may be determined depending on the type of the welding machine.

The data recording means 4 is adapted to record both of the situation information provided by the acoustical input means 2 and the welding information provided by the welding state detecting means 3 as regeneratable data in a recording medium, and includes at least a control section 5 and a recording section 6.

The control section 5 includes at least a CPU 7 and a memory 8 comprised of ROM and RAM of a proper capacity. When the situation information provided by the acoustical input means 2 and the welding information provided by the welding state detecting means 3 are input, the situation information and the welding information can be delivered as regeneratable data to the recording section 6.

The memory 8 is provided with various areas: an area for recording the situation information (situation data) provided by the acoustical input means 2 and the welding information (welding primary data) provided by the welding state detecting means 3; an area having a program stored therein for calculating various welding secondary data as desired, e.g., depending on a design concept, from the various welding information recorded in the recording area, e.g., calculating a weld time from an interval between turning-on and turning-off of the current detected by the current sensor, or calculating an effective value and an average value of current from an instantaneous value of current (welding current) detected by the current sensor, or forming a current waveform from the electric current detected by the current sensor; an area having a program stored therein for storing the situation data, the welding primary data and the welding secondary data as regeneratable data (recorded data); an area for temporarily recording the recorded data; and an area having a program stored therein and relating to the operation and control of the acoustical input means 2 and the welding state detecting means 3 as well as the data recording means 4. The term of "storing the situation information and the welding information as regeneratable data" means that the situation information and the welding information are stored as data which can be regenerated simultaneously in a one-to-one correspondence between themselves. More specifically, the welding information is stored as image data, and a voice indicating the welding situation is incorporated into the image data, thereby providing regeneratable data.

Alternatively, an appropriate range for the welding information on the welding primary data and the welding secondary data may be previously stored in the memory 8, and the memory 8 may be provided with an area having a program stored therein for determining an abnormality to provide a warning and stop the welding robot concurrently with the warning, when the welding information detected by the welding state detecting means 3 exceeds the appropriate range, a program for counting the number of runs of welding in the electrode section of the resistance welding machine to determine the timing of replacement of the electrode section, or program for switching over the current upon detecting a very small displacement during supplying of current.

A known recording mechanism (an external storing device) 9 for recording the regeneratable data delivered from the control section 5 is provided in the recording section 6, so that the regeneratable data delivered from the control section 5 is stored in the recording medium 10 by the recording mechanism 9.

Examples of the recording medium 10 are RAM, a magnetic tape, a magnets-optical disk, an IC card, a flash memory, a flexible disk, an optical disk and the like, and any of them may be selected and used, as required, e.g., depending on the service condition or the design concept. Any type of the recording mechanism 9 depending on the type of the selected recording medium 10 may be used.

A display means for displaying the welding information, e.g., a liquid crystal display panel, may be provided in the data recording means 4.

The operation of this embodiment having the above-described arrangement will be described below.

The welding situation and state recording system 1 according to this embodiment is used for recording the weld zone which is welded by the welding robot including the resistance welding machine which is adapted to carry out the welding by clamping the weld zone between the electrodes with a predetermined pressing force, and by supplying welding current to between the electrodes and used in an automated line for manufacturing a vehicle such as an automobile.

The welding robot, in which the welding situation and state recording system 1 according to this embodiment is used, is operated, so that when the electrodes are moved to the weld zone to clamp the weld zone therebetween with the predetermined pressure, and this clamped state is maintained for a predetermined time (for a squeeze time), electric current is supplied to between the electrodes to conduct the welding of the weld zone.

When the welding situation and state recording system 1 according to this embodiment is used, the preparation is completed by mounting the sensor constituting the welding state detecting means 3 at a predetermined position on the electrode section of the welding robot before driving of the welding robot. When a plurality of the acoustical input means 2 are used, a current supplying sound and a welding sound can be recorded precisely by disposing one of the acoustical input means 2 in the vicinity of the welding zone.

Then, the situation information on the weld zone welded by the electrode section of the welding robot is taken in by the acoustical input means 2 by turning on a record starting switch (not shown) before the welding robot is driven, thereby at least clamping the weld zone between the electrodes of the welding robot. Thus, the acoustical input means 2 takes in the motional sound of the welding robot and the motional sound of a welded work piece as the situation information for the weld zone, and converts the situation information into an electric signal to start an acoustical-data delivering operation for delivering the electric signal to the data recording means 4.

On the other hand, the welding robot is operated, so that when the weld zone is clamped between the electrodes of the welding robot with the predetermined pressure, and this state is maintained for the predetermined time, i.e., for the squeeze time, the electric current is supplied to between the electrodes to start the welding. Then, the welding state detecting means 3 mounted to the electrodes, e.g., the current sensor using a toroidal coil detects electric current (welding current) as the welding information to start the welding data delivering operation for delivering the detected current to the data recording means 4. The situation information on the welding situation at this time is taken in from the acoustical input means 2 by the operator's voice.

Then, both of the acoustic data as the situation information provided by the acoustical input data and the welding primary data as the welding information provided by the welding state detecting means 3 are once recorded in the memory 8. On the basis of the welding primary data stored in the memory 8, e.g., the welding current, a required welding secondary data such as a welding time, an effective value and an average value of current and a current waveform is produced by the program stored in the memory 8 or the like. The acoustical data, the welding primary data and the welding secondary data are stored as regeneratable recorded data (digital data) by the program stored in the memory 8. These regeneratable recorded data are recorded temporarily in sequence in the memory 8, e.g., in the area referred to as a buffer memory or the like and then delivered in sequence to the recording section 6.

Subsequently, the regeneratable recorded data delivered to the recording section 6 are recorded in the recording medium 10, e.g., the preselected recording medium 10, e.g., in a magnetic tape (a video tape) in such a manner that the welding information is recorded as an image data, and a voice indicating the welding situation is incorporated into the image data.

Then, when the magnetic tape as the recording medium 10 having the regeneratable data recorded therein is subjected to a regenerating operation, the voice indicating the welding situation and the welding data indicating the welding state, e.g., the current value and a picture image such as a current wave form are produced concurrently according to a time series.

In this way, with the welding situation and state recording system 1 according to the present embodiment, the information on the welding situation for the weld zone is taken in by the acoustical input means 2, and the welding information of the welding state at this time is detected by the welding state detecting means 3. Then, both of the situation information and the welding information are recorded as the regeneratable data (recorded data) in the data recording means 4, specifically, in the recording medium 10 constituting a portion of the data recording means 4.

Therefore, with the welding situation and state recording system 1 according to the present embodiment, both of the welding situation for the weld zone welded by the welding machine and the welding state at that time can be regenerated later, and specifically, the welding situation and the welding state can be confirmed simultaneously. Therefore, the welding situation and the welding state can be compared with each other in one-to-one correspondence between themselves and as a result, the meaning provided by the welding information can be analyzed easily. Namely, the content of the welding abnormality can be grasped later easily and precisely.

The welding situation and state recording means 1 according to the present invention may be arranged so that the situation information and the welding information are transmitted into a control room to monitor the welding situation and the welding state by the recording of the regeneratable data and the display of the regeneratable data in the control room.

Further, with the welding situation and state recording means 1 according to the present invention, the recording already made can be utilized as a record of introduction of a welding equipment and as a recording of data associated with a welding condition in determining the condition for a work to be welded, the welding state and the welding situation and the result of the welding of the weld zone. The welding situation and state recording means 1 can be utilized as an abnormal-situation transmitting means upon the occurrence of a failure in the automated line.

Although the embodiment of the present invention has been described in detail, it will be understood that the present invention is not limited to the above-described embodiment, and various modifications may be made without departing from the spirit and scope of the invention defined in claims.

What is claimed is:

1. A process for recording a welding situation and a welding state, comprising the steps of:

acoustically inputting a welding situation using a voice of an operator, detecting a welding state simultaneously with the acoustic inputting of the welding situation, and recording both of the situation information in the voice of the operator as acoustically inputted and the welding information as regeneratable data.

2. The process of claim 1 further comprising the step of acoustically inputting a current supply and a welding sound from an acoustic sensor provided in the vicinity of the weld zone.

3. A system for recording a welding situation and a welding state, comprising:

an acoustical input means for inputting a welding situation using a voice of an operator, a welding state detecting means for detecting a welding state of a weld zone, and a data recording means for simultaneously recording both of said welding situation provided by said acoustical input means and said welding state provided by said welding state detecting means as regeneratable data.

4. The system of claim 3 wherein a plurality of acoustic input means are provided and at least one of said plurality of acoustic input means is provided in the vicinity of the weld zone to acoustically input a current supply and welding sound and said data recording means records the acoustic inputs from the plurality of acoustic input means.

* * * * *